(12) United States Patent
Ishimaru et al.

(10) Patent No.: US 6,752,737 B2
(45) Date of Patent: Jun. 22, 2004

(54) GEAR SPEED-CHANGING APPARATUS FOR AUTOMATIC TRANSMISSIONS

(75) Inventors: Wataru Ishimaru, Kanagawa (JP); Yasuo Sumi, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/343,926

(22) PCT Filed: May 29, 2002

(86) PCT No.: PCT/JP02/05181
§ 371 (c)(1),
(2), (4) Date: Feb. 6, 2003

(87) PCT Pub. No.: WO02/099314
PCT Pub. Date: Dec. 12, 2002

(65) Prior Publication Data
US 2003/0224899 A1 Dec. 4, 2003

(30) Foreign Application Priority Data
May 30, 2001 (JP) .................................... 2001-161578

(51) Int. Cl.[7] .............................................. F16H 3/62
(52) U.S. Cl. ..................................................... 475/275
(58) Field of Search ........................................ 475/275

(56) References Cited

U.S. PATENT DOCUMENTS

| 4,027,551 A | 6/1977 | Murakami et al. | |
|---|---|---|---|
| 4,027,552 A | 6/1977 | Murakami et al. | |
| 5,106,352 A | 4/1992 | Lepelletier | |
| 2003/0186775 A1 * | 10/2003 | Ishimasu et al. | 475/275 |
| 2004/0014549 A1 * | 1/2004 | Choi | 475/269 |
| 2004/0014550 A1 * | 1/2004 | Tsuga | 475/275 |
| 2004/0014551 A1 * | 1/2004 | Tsuga | 475/275 |
| 2004/0014553 A1 * | 1/2004 | Ishimaru | 475/275 |
| 2004/0014554 A1 * | 1/2004 | Ishimaru | 475/296 |

FOREIGN PATENT DOCUMENTS

| JP | 50-160649 | 12/1975 |
|---|---|---|
| JP | 51-64156 | 6/1976 |
| JP | 51-91465 | 8/1976 |
| JP | 4-219553 A | 8/1992 |

* cited by examiner

*Primary Examiner*—Dirk Wright
(74) *Attorney, Agent, or Firm*—Foley & Lardner LLP

(57) ABSTRACT

A gear speed-changing apparatus can be obtained having made the degree of freedom for selecting a gear ratio higher than that of the case using the Ravigneaux type composite planetary gear train, while achieving a strength advantage (e.g., the gear strength or gear lifetime) of the gear train, an improvement in fuel economy, the coaxial layout of the input portion and the output portion and the size reduction of the automatic transmission altogether. The apparatus achieves six forward speeds and one reverse speed by engaging/disengaging three clutches C1, C2 and C3 and two brakes B1 and B2 properly. One G1 of three planetary gearsets G1, G2 and G3 is a speed-reducing device for reducing input speed always. One G3 of the remaining two planetary gearsets G2 and G3 is a double sun gear type planetary gearset, the carrier PC3 of which has a center member CM for inputting or outputting a rotation from between two sun gears S3 and S4. An intermediate wall 2 for defining the inside of a transmission case 1 into one side and the other side, is provided with cylinder chambers of brakes B1 and B2, and a supporting portion 22 for supporting a member 4 serving as a clutch drum of the third clutch C3.

9 Claims, 9 Drawing Sheets

|   | C1 | C2 | C3 | B1 | B2 | 5.5 | 6.0 | 6.5 | 7.0 |
|---|----|----|----|----|----|-----|-----|-----|-----|
| 1st | ○ |   |   | ○ |   | 4.060 | 4.260 | 4.583 | 4.782 |
| 2nd | ○ |   |   |   | ○ | 2.192 | 2.360 | 2.500 | 2.773 |
| 3rd | ○ | ○ |   |   |   | 1.538 | 1.600 | 1.677 | 1.818 |
| 4th | ○ |   | ○ |   |   | 1.153 | 1.164 | 1.170 | 1.205 |
| 5th |   | ○ | ○ |   |   | 0.891 | 0.870 | 0.862 | 0.824 |
| 6th |   |   | ○ |   | ○ | 0.741 | 0.714 | 0.714 | 0.678 |
| Rev |   | ○ |   | ○ |   | 4.396 | 4.000 | 4.167 | 3.828 |
| $\alpha 1$ |   |   |   |   |   | 0.350 | 0.375 | 0.400 | 0.450 |
| $\alpha 2$ |   |   |   |   |   | 0.350 | 0.400 | 0.400 | 0.475 |
| $\alpha 3$ |   |   |   |   |   | 0.425 | 0.475 | 0.500 | 0.525 |

FIG. 4a 1st
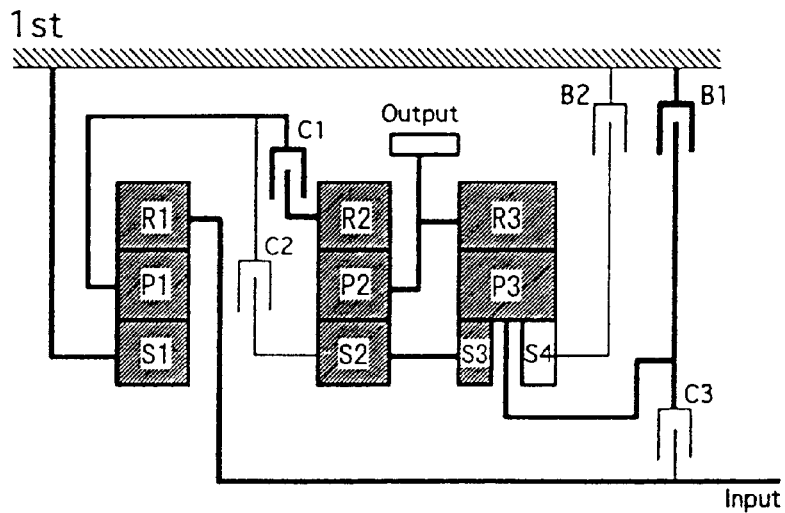
FIG. 4b 2nd
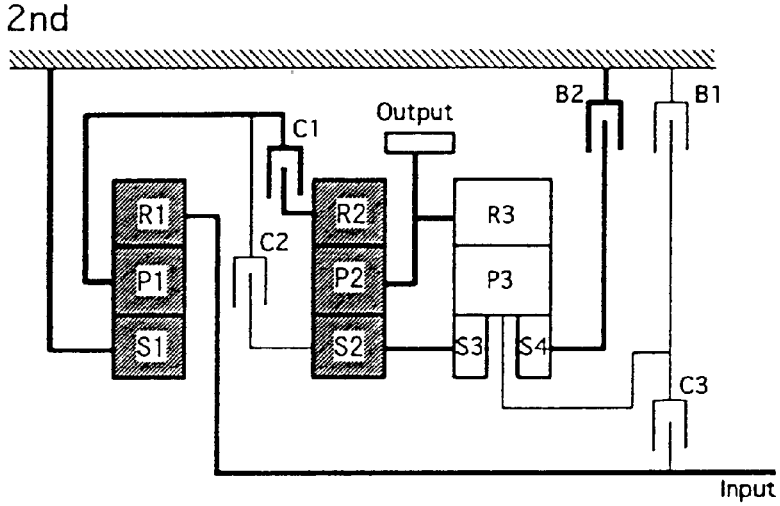
FIG. 4c 3rd
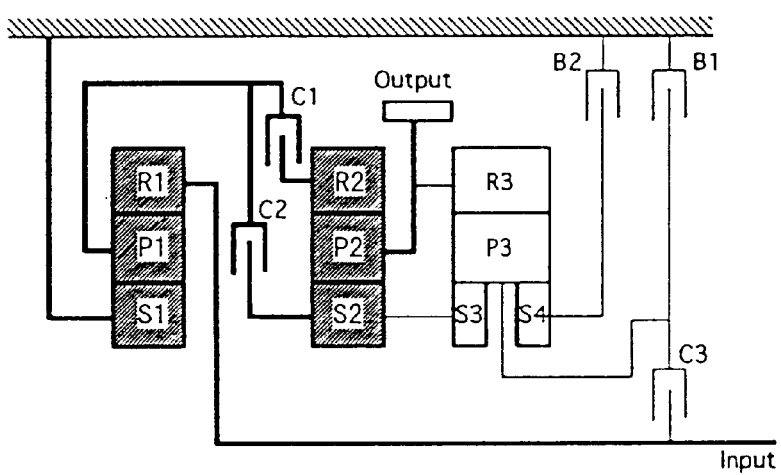

FIG. 5a 4th
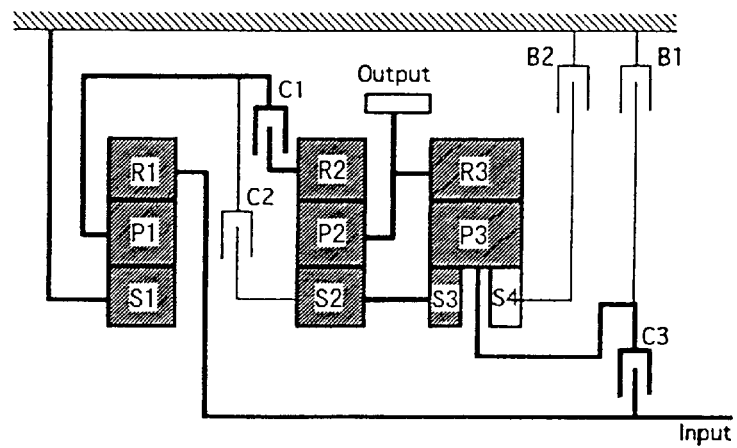
FIG. 5b 5th
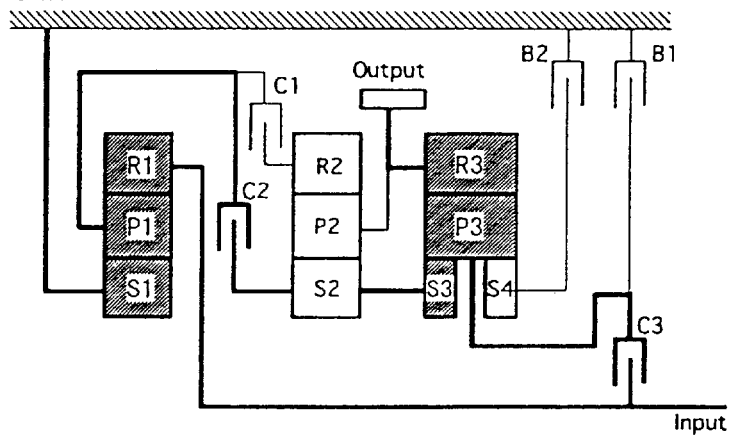
FIG. 5c 6th
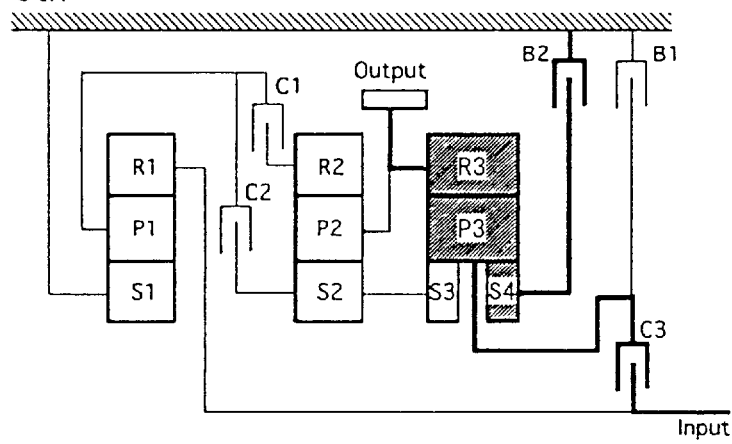

FIG.11

| | | 6TH SPEED | | | | | |
|---|---|---|---|---|---|---|---|
| | | RATIO COVERAGE : 1 | | | RATIO COVERAGE : 2 | | |
| | | RAVIG-NEAUX TYPE | ISHIMARU TYPE | | RAVIG-NEAUX TYPE | ISHIMARU TYPE | |
| | | | SPEED-REDUCING DOUBLE PINION | SPEED-REDUCING SINGLE PINION | | SPEED-REDUCING DOUBLE PINION | SPEED-REDUCING SINGLE PINION |
| PLANETARY GEAR RATIO | α1 | 0.575 | 0.350 | 0.550 | 0.650 | 0.425 | 0.625 |
| | α2 | 0.375 | 0.350 | 0.500 | 0.475 | 0.350 | 0.550 |
| | α3 | 0.350 | 0.500 | 0.375 | 0.350 | 0.500 | 0.350 |
| GEAR RATIO | 1st | 4.500 | 4.505 | 4.392 | 4.714 | 5.093 | 5.072 |
| | 2nd | 2.373 | 2.308 | 2.325 | 2.637 | 2.609 | 2.519 |
| | 3rd | 1.575 | 1.538 | 1.550 | 1.650 | 1.739 | 1.625 |
| | 4th | 1.146 | 1.136 | 1.148 | 1.160 | 1.170 | 1.141 |
| | 5th | 0.880 | 0.891 | 0.883 | 0.842 | 0.872 | 0.881 |
| | 6th | 0.727 | 0.741 | 0.727 | 0.678 | 0.741 | 0.741 |
| | Rev | 4.200 | 4.395 | 4.133 | 3.474 | 4.969 | 4.634 |
| STEP RATIO | 1st/2nd | 1.896 | 1.952 | 1.889 | 1.788 | 1.952 | 2.013 |
| | 2nd/3rd | 1.507 | 1.501 | 1.500 | 1.598 | 1.500 | 1.550 |
| | 3rd/4th | 1.374 | 1.354 | 1.356 | 1.422 | 1.488 | 1.424 |
| | 4th/5th | 1.302 | 1.275 | 1.294 | 1.378 | 1.342 | 1.295 |
| | 5th/6th | 1.210 | 1.202 | 1.215 | 1.242 | 1.177 | 1.189 |
| FORWARD/REVERSE RATIO | Rev/1st | 0.933 | 0.976 | 0.941 | 0.737 | 0.976 | 0.914 |
| TRANSMISSION EFFICIENCY | 1st | 0.968 | 0.969 | 0.974 | 0.968 | 0.989 | 0.974 |
| | 2nd | 0.950 | 0.968 | 0.972 | 0.952 | 0.968 | 0.972 |
| | 3rd | 0.993 | 0.988 | 0.993 | 0.993 | 0.988 | 0.993 |
| | 4th | 0.982 | 0.987 | 0.989 | 0.983 | 0.988 | 0.989 |
| | 5th | 0.989 | 0.988 | 0.989 | 0.989 | 0.989 | 0.990 |
| | 6th | 0.993 | 0.993 | 0.993 | 0.993 | 0.993 | 0.993 |
| | 7th | | | | | | |
| | Rev | 0.978 | 0.973 | 0.978 | 0.978 | 0.973 | 0.978 |
| TORQUE SHARED OF ENGAGEMENT ELEMENTS | C1 | 1.575 | 1.203 | 1.550 | 1.650 | 1.175 | 1.625 |
| | C2 | 1.575 | 1.538 | 1.550 | 1.650 | 1.739 | 1.625 |
| | C3 | 1.209 | 1.538 | 1.214 | 1.243 | 1.739 | 1.190 |
| | B1 | 5.775 | 0.769 | 5.683 | 5.124 | 0.909 | 6.268 |
| | B2 | 0.798 | 5.934 | 0.775 | 0.987 | 6.708 | 0.894 |
| | TOTAL | 10.932 | 10.982 | 10.772 | 10.654 | 12.270 | 11.602 |
| NUMBER OF ENGAGEMENT ELEMENTS INCREASED WITH OWC IN OPERATION | OWC1 | 0 | 0 | 0 | 0 | 0 | 0 |
| | OWC2 | 1 | 1 | 1 | 1 | 1 | 1 |
| | OWC3 | 2 | 2 | 2 | 2 | 2 | 2 |
| RATIO COVERAGE | MIN. | 4.81 | 5.08 | 4.81 | 4.81 | 5.08 | 4.81 |
| | MAX. | 7.20 | 9.02 | 7.80 | 7.20 | 9.02 | 7.80 |
| DIRECT-ENGAGEMENT MODE | | NO | NO | NO | NO | NO | NO |
| TO 7TH SPEED | | OK | OK | OK | OK | OK | OK |

GEAR SPEED-CHANGING APPARATUS FOR AUTOMATIC TRANSMISSIONS

TECHNICAL FIELD

This invention relates to a gear speed-changing apparatus for an automatic transmission, which is constructed to include an input portion, three sets of planetary gears, three clutches, two brakes and an output portion and which is enabled to achieve at least six forward speeds and one reverse speed by engaging/releasing the three clutches and the two brakes properly as speed-changing elements.

BACKGROUND TECHNIQUE

A gear speed-changing apparatus for an automatic transmission, which is constructed to include an input shaft, one set of single-pinion type planetary gear, a Simpson type planetary gear train having two sets of single-pinion type planetary gearsets combined with each other, three clutches, two brakes and an output shaft and which is enabled to achieve six forward speeds and one reverse speed by engaging/releasing the three clutches and the two brakes properly as speed-changing elements, has been proposed in the prior art in FIG. 7 of JP-A-4-219553.

This gear speed-changing apparatus constructed of one single-pinion type planetary gear and a Simpson type planetary gear train has the features, as enumerated in the following.

(1) An advantage is taken at the strength because the flow of the torque transmission at the 1st speed for the highest torque of the Simpson type planetary gear train is borne through all members.

(2) An advantage is taken at the gear strength, the gear lifetime, the carrier rigidity and so on, because the Simpson type planetary gear train employs the ring gear input so that the tangential force is reduced to about one half of that of the sun gear input.

(3) For the gear range of an overdrive, there is needed a carrier input to the Simpson type planetary gear train. If the input shaft and the output shaft are coaxially arranged, the input route to the carrier is not satisfied by the single-pinion type planetary gear in which the number of rotary members is limited to three. In order to secure the input route to the carrier, therefore, the input shaft and the output shaft have to be positioned in parallel on the different axis thereby to enlarge the size of the automatic transmission.

In order to solve the aforementioned problem (3), therefore, a gear speed-changing apparatus using a Ravigneaux type composite planetary gear train (i.e., the composite planetary gear train having sun gears meshing individually with double pinions) in place of the Simpson type planetary gear train has been proposed in FIG. 13, FIG. 14 and FIG. 15 of JP-A-4-219553.

However, the gear speed-changing apparatus adopting that Ravigneaux type composite planetary gear train has the problems, as enumerated in the following.

(5) The strength is at a disadvantage because the maximum torque (for a 1st speed) of the gear train is borne by the single-pinion type planetary gear on one side of the Ravigneaux type composite planetary gear train.

(6) Another disadvantage resides in the gear strength, the gear lifetime or the carrier rigidity, because the torque augmented by one single-pinion type planetary gear acting as a speed-reducing device is inputted from the sun gear of the Ravigneaux type composite planetary gear train so that the tangential force becomes higher than that of the ring gear input.

(7) The Ravigneaux type composite planetary gear train has to be enlarged to enlarge the automatic transmission, because there are demanded both the securement of the strength (e.g., the gear strength or the gear lifetime) at the 1st speed and the improvement in the carrier rigidity of the Ravigneaux type composite planetary gear train.

(8) Depending upon the gear range, a torque circulation occurs in the Ravigneaux type composite planetary gear train so that the transmission efficiency drops to deteriorate the fuel economy at the gear range where the torque circulation occurs.

In short, the gear speed-changing apparatus, in which one set of single-pinion type planetary gear is combined with the Ravigneaux type composite planetary gear train, cannot be avoided in the size enlargement of the automatic transmission, because both the aforementioned advantages (1) and (2) of the gear speed-changing apparatus using the single-pinion type planetary gear and the Simpson type planetary gear train are offset and because the Ravigneaux type composite planetary gear train is enlarged for the aforementioned reason (3).

The present invention has been conceived noting the above-specified problems and has an object to provide a gear speed-changing apparatus for an automatic transmission, which can make the degree of freedom for selecting a gear ratio higher than that of the case using the Ravigneaux type composite planetary gear train, while achieving a strength advantage of the gear train, an advantage of the gear strength, the gear lifetime and so on, an improvement in the fuel economy, the coaxial positioning of the input portion and the output portion and the size reduction of the automatic transmission altogether. Another object is to provide a concrete layout of an automatic transmission for solving the above-specified problems.

DISCLOSURE OF THE INVENTION

According to the present invention, more specifically, in a gear speed-changing apparatus for an automatic transmission, which has speed change control means using not the Ravigneaux type composite planetary gear train but basically a gear train having two sets of combined single-pinion type planetary gears as a gear train to be combined with one set of planetary gear, thereby to establish at least six forward speeds and one reverse speed by engaging/releasing three clutches and two brakes properly, one of the aforementioned three planetary gearsets is a speed-reducing device for reducing the speed of the input rotation always, and one of the remaining two planetary gearsets is a double sun gear type planetary gearset including: two sun gears; a pinion meshing individually with said two sun gears; a carrier having a center member positioned between the aforementioned two sun gears for inputting or outputting a rotation; and one ring gear meshing with the aforementioned pinion.

This double sun gear type planetary gear is similar in the basic gear performance to a single-pinion type planetary gear, but is characterized in that the member number is so larger than that of the single-pinion type planetary gear having three members as (two members from the sun gear)+(one member from the ring gear)+(two axial and radial members from the carrier)=five members.

The gear train having a single-pinion type planetary gear and a double sun gear type planetary gear combined therein will be named the "Ishimaru type planetary gear train" by quoting the name of the inventor so that it may be discriminated from the "Ravigneaux type composite planetary gear train" or the "Simpson type planetary gear train", Thus, the construction is made by combining one set of planetary gear and the Ishimaru type planetary gear train having a fundamental performance similar to that of the Simpson type planetary gear train. It is, therefore, possible to achieve both the strength advantage of the planetary gear because of the possibility of the ring gear input and the advantage of the gear strength or the gear lifetime of the planetary gear because the torque flow at the 1st speed can be borne through all members.

The construction is also made such that the Ishimaru type planetary gear train is used as the remaining two planetary gearsets but not the Ravigneaux type composite planetary gear train. Therefore, the improvement in the fuel economy can be achieved by the high transmission efficiency having no torque circulation.

Of the remaining two sets of planetary gears (or Ishimaru type planetary gear train), moreover, one planetary gearset is exemplified by the double sun gear type planetary gear having the center member positioned between the two sun gears. Therefore, an input route to the carrier can be formed to accomplish such coaxial positioning the input portion and the output portion.

With the construction not using the Ravigneaux type composite planetary gear train but positioning the input portion and the output portion coaxially, moreover, the gear speed-changing apparatus can be made compact to achieve the size reduction of the automatic transmission.

Still moreover, the Ravigneaux type composite planetary gear train is regulated by that the ring gear tooth number is constant when the gear ratio (=sun gear tooth number/ring gear tooth number) is to be set. Considering the conditions of a generally applicable gear ratio range and the smaller step ratio for the higher gear ranges, therefore, the Ishimaru type planetary gear train capable of setting the gear ratios of two planetary gearsets independently of each other can have a wider applicable gear ratio range and a higher degree of freedom for selecting the gear ratio than those of the Ravigneaux type composite planetary gear train.

Moreover, an intermediate wall, as disposed in the case and defining the case inside into one side and the other side, is constructed to form two brake cylinder chambers and to support the clutch drum of one of the three clutches. Therefore, the clutches and the brakes can be efficiently arranged to make the entire length of the transmission compact.

By positioning the clutches and the brakes altogether near the intermediate wall, moreover, the handling of the oil passages can be facilitated to make the transmission compact.

Still moreover, the intermediate wall can be sub-assembled with the brakes and the clutches, and the intermediate wall sub-assembly can be made on a line different from the main assembly line so that the transmission can be easily manufactured.

BRIEF DESCRIPTION OF THE DRAWINGS

FIGS. 4a-4c present torque flow diagrams of the automatic transmission gear speed-changing apparatus of the first embodiment at 1st, 2nd and 3rd speeds.

FIGS. 5a-5c present torque flow diagrams of the automatic transmission gear speed-changing apparatus of the first embodiment at 4th, 5th 6th speeds.

FIG. 11 is a diagram showing performance comparisons of a gear speed-changing apparatus using the Ravigneaux type composite planetary gear train and a gear speed-changing apparatus using the Ishimaru type planetary gear train.

BEST MODE FOR CARRYING OUT THE INVENTION

A first embodiment for realizing the gear speed-changing apparatus for the automatic transmission of the present invention will be described with reference to the accompanying drawings.

First Embodiment

Detailed Description Based on the Schematic of the First Embodiment

First of all, the construction based on the schematic diagram of the automatic transmission gear speed-changing apparatus of the present invention will be described in the following.

Figures 1, 2:
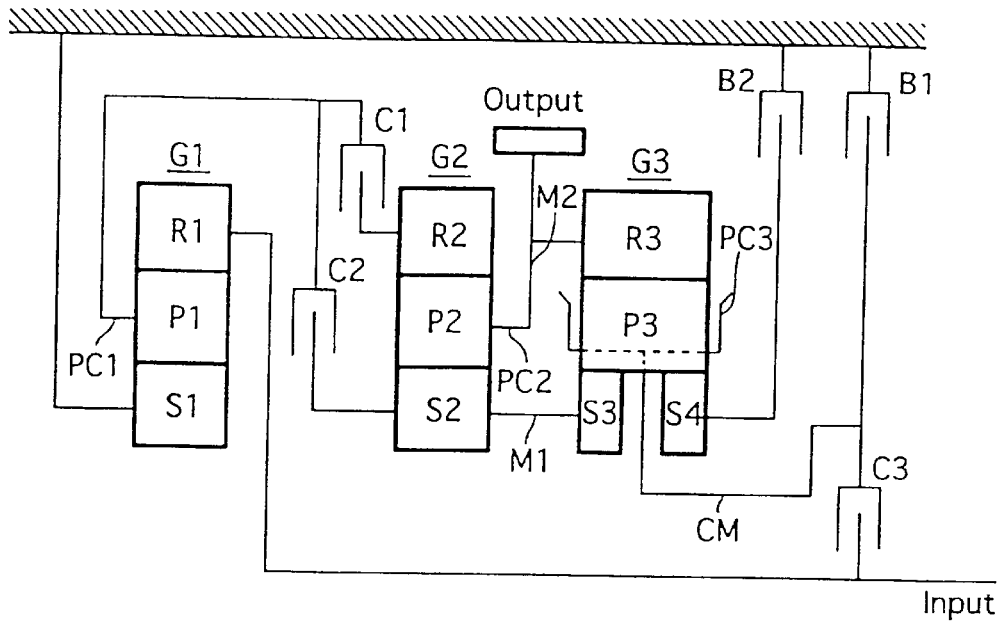
FIG. 1 is a schematic diagram showing a gear speed-changing apparatus for an automatic transmission of a first embodiment.
FIG. 2 is an engagement table of the automatic transmission gear speed-changing apparatus of the first embodiment.

FIG. 1 is a schematic diagram showing the automatic transmission gear speed-changing apparatus of the first embodiment.

In FIG. 1: G1 designates a first planetary gearset; G2 a second planetary gearset; G3 a third planetary gearset; M1 a first connection member; M2 a second connection member; C1 a first clutch; C2 a second clutch; C3 a third clutch; B1 a first brake; B2 a second brake; Input an input shaft (or an input portion); and Output an output gear (or an output portion).

The automatic transmission gear speed-changing apparatus (of a speed-reducing single type 1) of the first embodiment is an example, in which the first planetary gearset G1 of a single-pinion type is positioned as a speed-reducing device at the lefthand end portion of FIG. 1, in which the second planetary gearset G2 of a single-pinion type is positioned at the central portion and in which the third planetary gearset G3 of a double sun gear type is positioned at the righthand end portion. And, the aforementioned second planetary gearset G2 and third planetary gearset G3 construct the so-called "Ishimaru type planetary gear train".

The aforementioned first planetary gearset G1 is the single-pinion type planetary gearset acting as the speed-reducing device, which includes: a first sun gear S1; a first ring gear R1; and a first carrier PC1 for supporting a first pinion P1 meshing with the two gears S1 and R1.

The aforementioned second planetary gearset G2 is the single-pinion type planetary gearset, which includes: a second sun gear S2; a second ring gear R2; and a second carrier PC2 for supporting a second pinion P2 meshing with the two gears S2 and R2.

The aforementioned third planetary gearset G3 is the double sun gear type planetary gearset, which includes: two third sun gear S3 and fourth sun gear S4; a third pinion P3 meshing individually with the third and fourth sun gears S3 and S4; an axial third carrier PC3 for supporting the third pinion P3; a center member CM connected to said third carrier PC3 and positioned between the aforementioned two sun gears S3 and S4; and one third ring gear R3 meshing with the aforementioned third pinion P3.

Here, the aforementioned center member CM is coupled to the third carrier PC3 at spatial positions of the third pinion P3 adjoining on the circumference of the third carrier PC3.

The aforementioned input shaft Input is connected to the first ring gear R1 and receives a rotational driving force from the not-shown engine or driving source through a torque converter or the like.

The aforementioned output gear Output is connected to the second carrier PC2 and transmits the outputted rotational driving force to driven wheels through the not-shown final gear or the like.

The aforementioned first connection member M1 is the member for connecting the second sun gear S2 and the third sun gear S3 integrally.

The aforementioned second connection member M2 is the member for connecting the second carrier PC2 and the third ring gear R3 integrally.

The aforementioned first clutch C1 is the clutch for connecting/disconnecting the first carrier PC1 and the second ring gear R2 selectively.

The aforementioned second clutch C2 is the clutch for connecting/disconnecting the first carrier PC1 and the second sun gear S2 selectively.

The aforementioned third clutch C3 is the clutch for connecting/disconnecting the input shaft Input and the center member CM selectively.

The aforementioned first brake B1 is the brake for stopping the rotation of the third carrier PC3 selectively.

The aforementioned second brake B2 is the brake for stopping the rotation of the fourth sun gear S4 selectively.

To the aforementioned individual clutches C1, C2 and C3 and individual brakes B1 and B2, there is connected the not-shown hydraulic speed change control device (or speed change control means) for establishing engagement pressures (with circle symbols) and release pressures (with no symbol) at individual gear ranges, as shown in an engagement table of FIG. 2. As the hydraulic speed change control device, here is adopted the hydraulic control type, the electronic control type, the hydraulic+electronic control type or the like.

The actions will be described in the following.

Shifting Actions

Figure 3:
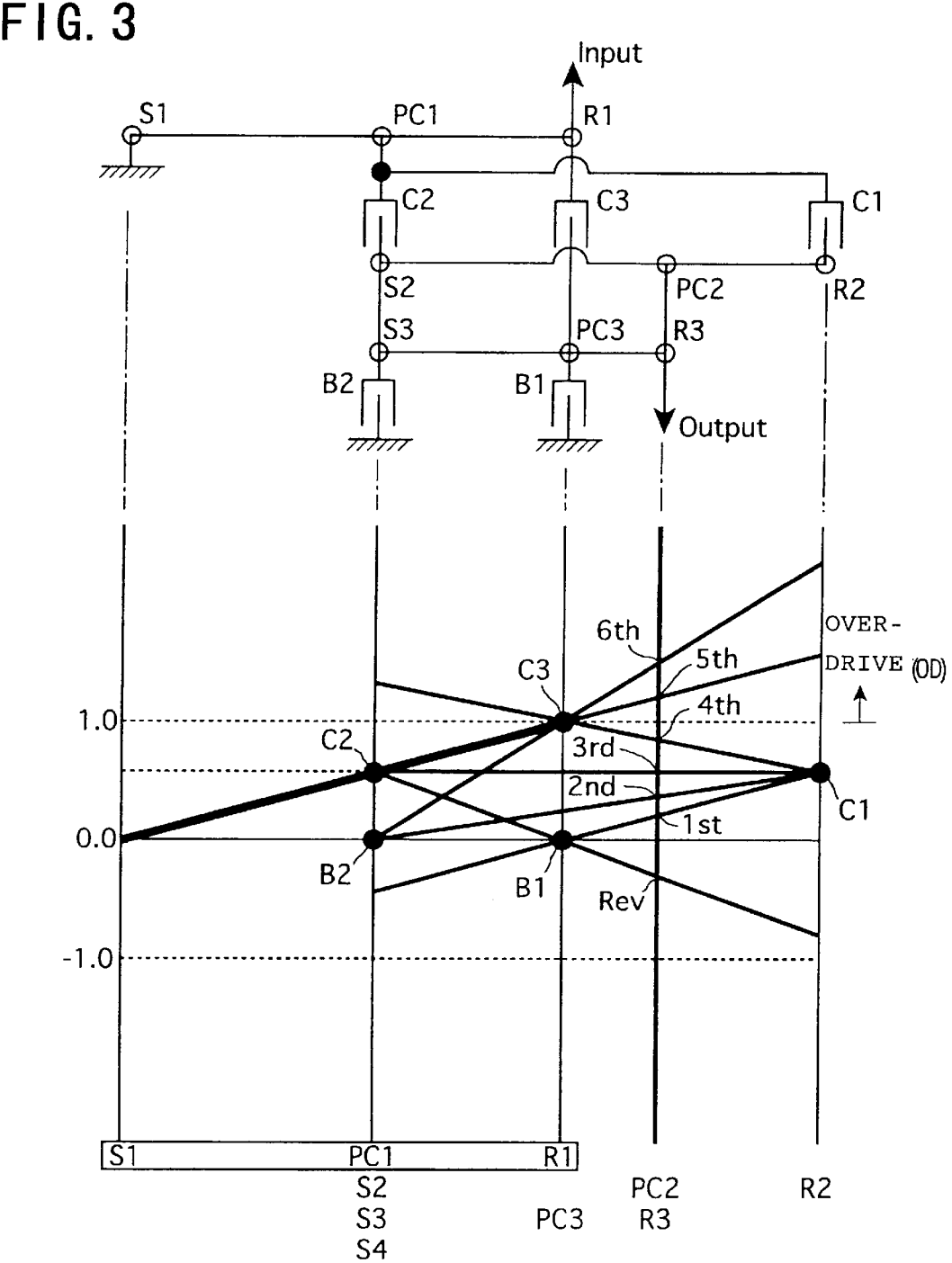
FIG. 3 is a collinear diagram in the automatic transmission gear speed-changing apparatus of the first embodiment.
Figure 6:
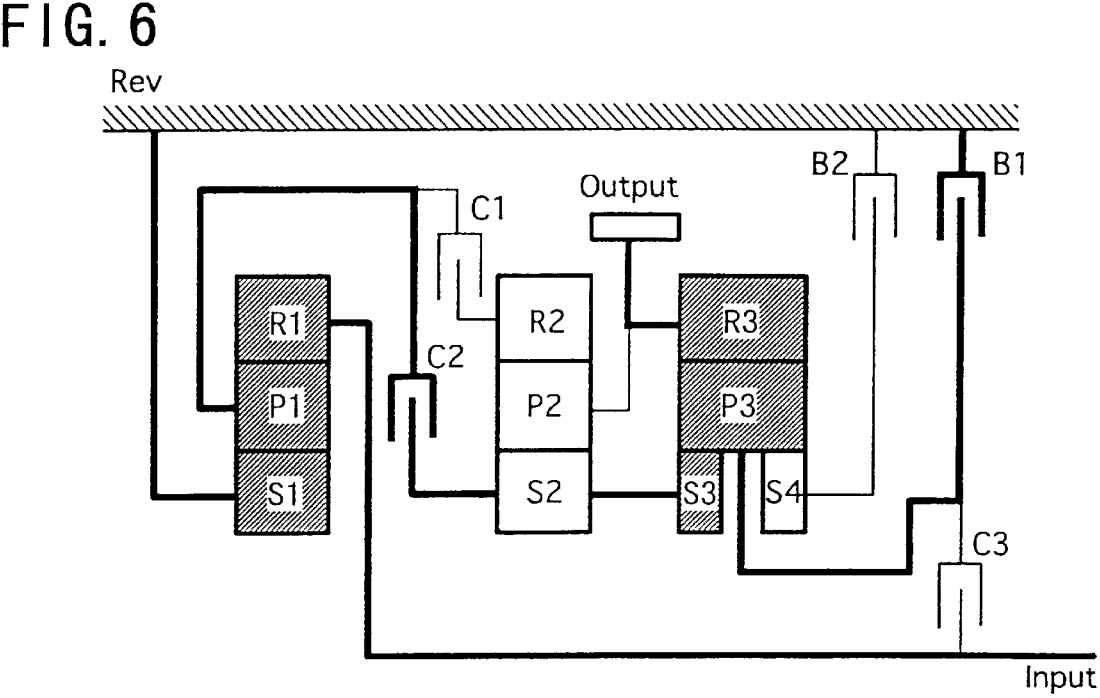
FIG. 6 is a torque flow diagram of the automatic transmission gear speed-changing apparatus of the first embodiment at a reverse speed.

FIG. 2 is a diagram showing the engagement table in the automatic transmission gear speed-changing apparatus of the first embodiment; FIG. 3 is a collinear diagram showing the rotation stopping states of members at the individual gear ranges in the automatic transmission gear speed-changing apparatus of the first embodiment; and FIG. 4 to FIG. 6 are diagrams showing the torque flows at the individual gear ranges in the automatic transmission gear speed-changing apparatus of the first embodiment. In FIG. 3, thick lines indicate the collinear diagram of the first planetary gearset G1, and intermediate lines indicate the collinear diagram of the Ishimaru planetary gear trains. In FIG. 4 to FIG. 6, the torque transmission routes of the clutches/brakes/members are indicated by thick lines, and the torque transmission routes of the gears are indicated by hatching them.

As shown in FIG. 2, the 1st speed is achieved by the engagements of the first clutch C1 and the first brake B1.

At this 1st speed, in the second planetary gearset G2, the speed-reduced rotation from the first planetary gearset G1 is inputted to the second ring gear R2 by the engagement of the first clutch C1.

In the third planetary gearset G3, on the other hand, the third carrier PC3 is fixed on a case by the engagement of the first brake B1 so that the rotation of the third sun gear S3 is the speed-reduced rotation reversed from the output rotation of the third ring gear R3. And, this rotation of the third sun gear S3 is transmitted through the first connection member M1 to the second sun gear S2 of the second planetary gearset G2.

In the second planetary gearset G2, therefore, the forward speed-reduced rotation is inputted from the second ring gear R2, and the backward speed-reduced rotation is inputted from the second sun gear S2 to the second planetary gearset G2 so that the rotation further reduced in speed from the speed-reduced rotation of the second ring gear R2 is outputted from the second carrier PC2 through the second connection member M2 to the output gear Output.

As shown in the collinear diagram of FIG. 3, more specifically, the 1st speed is defined by the line which joins the engagement point of the first clutch C1 for inputting the speed-reduced rotation from the first planetary gearset G1 to the second ring gear R2 and the engagement point of the first brake B1 for stopping the rotation of the third carrier PC3, and the rotation inputted from the input shaft Input is reduced in speed and outputted from the output gear Output.

In the torque flow at this 1st speed, as shown in FIG. 4(a), the torque is applied to the first clutch C1, the first brake B1 and the individual members, as indicated by the thick lines, and to the first planetary gearset G1, the second planetary gearset G2 and the third planetary gearset G3 (excepting the fourth sun gear S4), as hatched. In short, at the 1st speed, the first planetary gearset G1, and the second planetary gearset G2 and the third planetary gearset G3, as constructing the Ishimaru type planetary gear train, participate in the torque transmission.

2nd Speed

As shown in FIG. 2, the 2nd speed is achieved by releasing the first brake B1 at the 1st speed and engaging the second brake B2, that is, by engaging the first clutch C1 and the second brake B2.

At this 2nd speed, in the second planetary gearset G2, the speed-reduced rotation from the first planetary gearset G1 is inputted to the second ring gear R2 by the engagement of the first clutch C1.

In the third planetary gearset G3, on the other hand, the fourth sun gear S4 is fixed on the case by the engagement of the second brake B2 so that the third sun gear S3 connected by the third pinion P3 is fixed. And, the second sun gear S2 connected to the third sun gear S3 through the first connection member M1 is fixed on the case.

In the second planetary gearset G2, therefore, the forward speed-reduced rotation is inputted from the second ring gear R2 to fix the second sun gear S2, and the rotation further reduced to a speed lower than that of the speed-reduced rotation from the second ring gear R2 is outputted from the second carrier PC2 through the second connection member M2 to the output gear Output.

As shown in the collinear diagram of FIG. 3, more specifically, the 2nd speed is defined by the line which joins the engagement point of the first clutch C1 for inputting the speed-reduced rotation from the first planetary gearset G1 to the second ring gear R2 and the engagement point of the second brake B2 for stopping the rotation of the fourth sun gear S4, and the rotation inputted from the input shaft Input is reduced to a speed (higher than that of the 1st speed) and outputted from the output gear Output.

In the torque flow at this 2nd speed, as shown in FIG. 4(b), the torque is applied to the first clutch C1, the second brake B2 and the individual members, as indicated by the thick lines, and to the first planetary gearset G1 and the second planetary gearset G2, as hatched. Here in the third planetary gearset G3, the unconstrained third pinion P3 revolves about the two fixed sun gears S3 and S4 in accordance with the output rotation of the third ring gear R3 so that it functions as a rotary member but does not participate in the torque transmission.

3rd Speed

As shown in FIG. 2, the 3rd speed is achieved by releasing the second brake B2 at the 2nd speed and engaging the second clutch C2, that is, by engaging the first clutch C1 and the second clutch C2.

At this 3rd speed, in the second planetary gearset G2, the speed-reduced rotation from the first planetary gearset G1 is inputted to the second ring gear R2 by the engagement of the first clutch C1. At the same time, this speed-reduced rotation is inputted to the second sun gear S2 of the second planetary gearset G2 by the engagement of the second clutch C2.

In the second planetary gearset G2, therefore, the same speed-reduced rotations are inputted from the second ring gear R2 and the second sun gear S2 so that the speed-reduced rotation (=the speed-reduced rotation of the first planetary gearset G1) is outputted from the second carrier PC2 rotating integrally with the two gears R2 and S2, through the second connection member M2 to the output gear Output.

As shown in the collinear diagram of FIG. 3, more specifically, the 3rd speed is defined by the line which joins the engagement point of the first clutch C1 for inputting the speed-reduced rotation from the first planetary gearset G1 to the second ring gear R2 and the engagement point of the second clutch C2 for inputting the speed-reduced rotation from the first planetary gearset G1 to the second sun gear S2, and the rotation inputted from the input shaft Input is reduced at a ratio (=the reduction ratio of the first planetary gearset G1) and outputted from the output gear Output.

In the torque flow at this 3rd speed, as shown in FIG. 4(c), the torque is applied to the first clutch C1, the second clutch C2 and the individual members, as indicated by the thick lines, and to the first planetary gearset G1 and the second planetary gearset G2, as hatched. In short, the third planetary gearset G3 does not participate in the torque transmission in the least.

4th Speed

As shown in FIG. 2, the 4th speed is achieved by releasing the second clutch C2 at the 3rd speed and engaging the third clutch C3, that is, by engaging the first clutch C1 and the third clutch C3.

At this 4th speed, in the second planetary gearset G2, the speed-reduced rotation from the first planetary gearset G1 is inputted to the second ring gear R2 by the engagement of the first clutch C1.

In the third planetary gear G3, on the other hand, the input rotation from the input shaft Input is inputted through the center member CM to the third carrier PC3 by the engagement of the third clutch C3. As a result the rotation of the third sun gear S3 is increased to a higher speed than that of the output rotation of the third ring gear R3 and is transmitted through the first connection member M1 to the second sun gear S2.

In the second planetary gearset G2, therefore, the speed-reduced rotation is inputted from the second ring gear R2, and the speed-increased rotation is inputted from the second sun gear S2, so that the rotation (at a lower speed than that of the input rotation) increased in speed from the speed-reduced rotation of the second ring gear R2 is outputted from the second carrier PC2 through the second connection member M2 to the output gear Output.

As shown in the collinear diagram of FIG. 3, more specifically, the 4th speed is defined by the line which joins the engagement point of the first clutch C1 for inputting the speed-reduced rotation from the first planetary gearset G1 to the second ring gear R2 and the engagement point of the third clutch C3 for inputting the rotation of the third carrier PC3, and the rotation inputted from the input shaft Input is slightly reduced in speed and outputted from the output gear Output.

In the torque flow at this 4th speed, as shown in FIG. 5(a), the torque is applied to the first clutch C1, the third clutch C3 and the individual members, as indicated by the thick lines, and to the first planetary gearset G1, the second planetary gearset G2 and the third planetary gearset G3 (excepting the fourth sun gear S4), as hatched.

5th Speed

As shown in FIG. 2, the 5th speed is achieved by releasing the first clutch C1 at the 4th speed and engaging the second clutch C2, that is, by engaging the second clutch C2 and the third clutch C3.

At this 5th speed, the speed-reduced rotation from the first planetary gearset G1 is inputted through the second sun gear S2 and the first connection member M1 to the third sun gear S3 by the engagement of the second clutch C2. At the same time, the input rotation from the input shaft Input is inputted through the center member CM to the third carrier PC3 by the engagement of the third clutch C3.

In the third planetary gearset G3, therefore, the input rotation is inputted to the third carrier PC3, and the speed-reduced rotation from the first planetary gearset G1 is inputted to the third sun gear S3, so that the rotation increased in speed to a higher speed than that of the input rotation is outputted from the third ring gear R3 through the second connection member M2 to the output gear Output.

As shown in the collinear diagram of FIG. 3, specifically, the 5th speed is defined by the line which joins the engagement point of the second clutch C2 for inputting the speed-reduced rotation from the first planetary gearset G1 to the third sun gear S3 and the engagement point of the third clutch C3 for inputting the rotation of the third carrier PC3, and the rotation inputted from the input shaft Input is slightly increased in speed and outputted from the output gear Output.

In the torque flow at this 5th speed, as shown in FIG. 5(b), the torque is applied to the second clutch C2, the third clutch C3 and the individual members, as indicated by the thick lines, and to the first planetary gearset G1 and the third planetary gearset G3 (excepting the fourth sun gear S4), as hatched.

6th Speed

As shown in FIG. 2, the 6th speed is achieved by releasing the second clutch C2 at the 5th speed and engaging the second brake B2, that is, by engaging the third clutch C3 and the second brake B2.

At this 6th speed, the input rotation of the input shaft Input is inputted through the center member CM of the third planetary gearset G3 to the third carrier PC3 by the engagement of the third clutch C3. By the engagement of second brake B2, moreover, the fourth sun gear S4 of the third planetary gearset G3 is fixed on the case.

In the third planetary gearset G3, therefore, the input rotation is inputted to the third carrier PC3, and the fourth sun gear S4 is fixed on the case, so that the rotation increased to a higher speed than that of the input rotation is outputted from the third ring gear R3 through the second connection member M2 to the output gear Output.

As shown in the collinear diagram of FIG. 3, more specifically, the 6th speed is defined by the line which joins the engagement point of the third clutch C3 for inputting the rotation of the third carrier PC3 and the engagement point of the second brake B2 for fixing the fourth sun gear S4 on the case, and the rotation inputted from the input shaft Input is increased in speed and outputted from the output gear Output.

In the torque flow at this 6th speed, as shown in FIG. 5(c), the torque is applied to the third clutch C3, the second brake B2 and the individual members, as indicated by the thick lines, and to the third planetary gearset G3 (excepting the third sun gear S3), as hatched.

Reverse Speed

As shown in FIG. 2, the reverse speed is achieved by engaging the second clutch C2 and the first brake B1.

At this reverse speed, the speed-reduced rotation from the first planetary gearset G1 is inputted through the second sun gear S2 and the first connection member M1 to the third sun gear S3 by the engagement of the second clutch C2. By the engagement of the first brake B1, on the other hand, the third carrier PC3 is fixed on the case.

In the third planetary gearset G3, therefore, the forward speed-reduced rotation is inputted to the third sun gear S3, and the third carrier PC3 is fixed on the case, so that the speed-reduced backward rotation is outputted from the third ring gear R3 through the second connection member M2 to the output gear Output.

As shown in the collinear diagram of FIG. 3, more specifically, the reverse speed is defined by the line which joins the engagement point of the second clutch C2 for inputting the speed-reduced rotation from the first planetary gearset G1 to the third sun gear S3 and the engagement point of the first brake B1 for stopping the rotation of the third carrier PC3, and the rotation inputted from the input shaft Input is reduced backward in speed and outputted from the output gear Output.

In the torque flow at this reverse speed, as shown in FIG. 6, the torque is applied to the second clutch C2, the first brake B1 and the individual members, as indicated by the thick lines, and to the first planetary gearset G1 and the third planetary gearset G3 (excepting the fourth sun gear S4), as hatched.

Advantages by Contrasts

The basic concept of the automatic transmission gear speed-changing apparatus of the present invention is to provide a gear speed-changing apparatus which achieves six forward speeds with three clutches and two brakes, which solves the problems of the Simpson type planetary gear train although based on the planetary gearset+the Simpson type planetary gear train and which overcomes the gear speed-changing apparatus according to the planetary gearset+the Ravigneaux type composite planetary gear train. The advantages will be described in contrast to the gear speed-changing apparatus adopting the Simpson type planetary gear train and the Ravigneaux type composite planetary gear train.

Figure 8A:
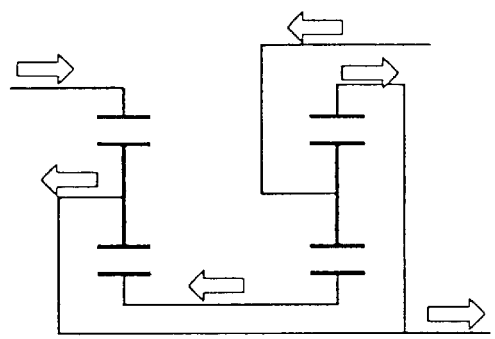
FIGS. 8a and 8b present diagrams showing torque transmission routes at the 1st speed in the Simpson type planetary gear train and the Ravigneaux type composite planetary gear train.

Features of Simpson Type Planetary Gear Train (1) The Simpson type planetary gear train is advantageous in strength because the flow of the torque transmission at the 1st speed for the maximum torque is shared among all members, as shown in FIG. 8(a).

Figure 9:
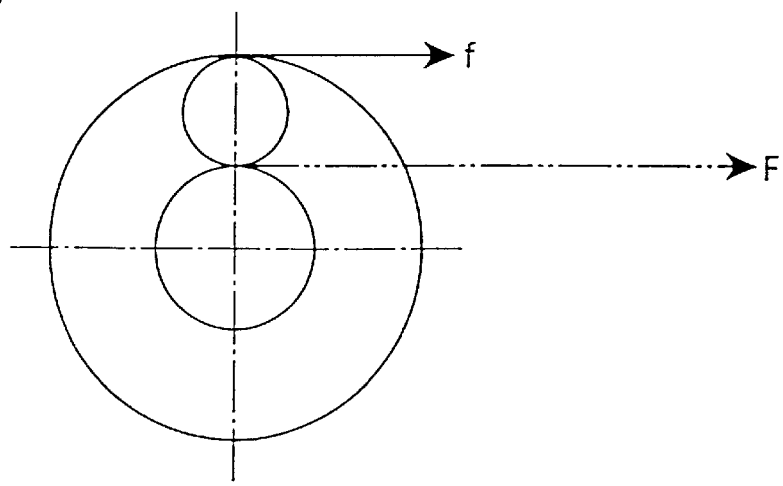
FIG. 9 is a diagram for explaining that a ring gear input is more advantageous than a carrier input.

(2) The Simpson type planetary gear train is advantageous in gear strength, gear lifetime, carrier rigidity and so on, because it uses the ring gear input so that the tangential force is about one half of the sun gear input. In case the same torque is inputted to the planetary gear, as shown in FIG. 9, a ring gear input f is reduced in tangential force to ½ to ½.5 of a sun gear input F.

Figures 10A, 10B, 10C:
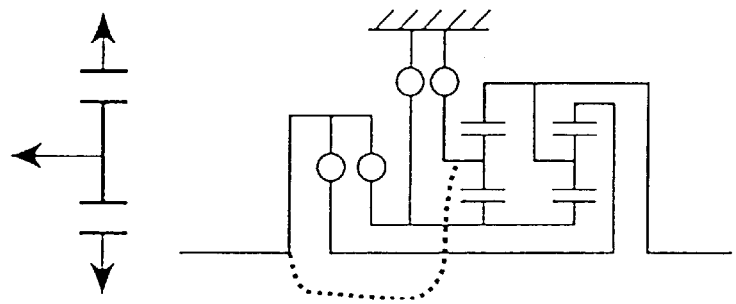
FIGS. 10a-10c present diagrams for explaining that a carrier input for achieving an overdrive gear cannot be realized in the case of the Simpson type planetary gear train, and that a double sun gear type planetary gearset has five members.

(3) For achieving an overdrive gear, there is needed the carrier input to the Simpson type planetary gear train. If the input shaft and the output shaft are positioned on a common axis, the number of the rotary members in the single-pinion type planetary gearset is limited to three, as shown in FIG. 10(a), so that the input route to the carrier is not formed, as indicated by a dotted line in FIG. 10(b).

For this input route to the carrier, therefore, it is necessary to position the input shaft and the output shaft in parallel on different axes. As a result, the problem is to invite a large size of the automatic transmission.

Problems of Ravigneaux Type Composite Planetary Gear Train

In order to solve the aforementioned problem (3), therefore, the gear speed-changing apparatus adopts the Ravigneaux type composite planetary gear train in place of the Simpson type planetary gear train. This gear speed-changing apparatus can achieve the coaxial positioning of the input shaft and the output shaft but has the problems, as enumerated in the following.

Figure 8B:
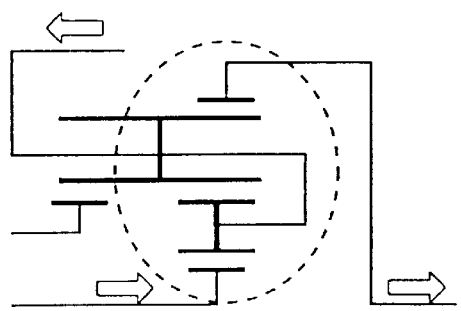

(5) The gear speed-changing apparatus is disadvantageous in strength because the maximum toque (at the 1st speed) of the gear train is borne by the double-pinion type planetary gearset on one side of the Ravigneaux type composite planetary gear train, as shown in FIG. 8(b).

Figure 7:
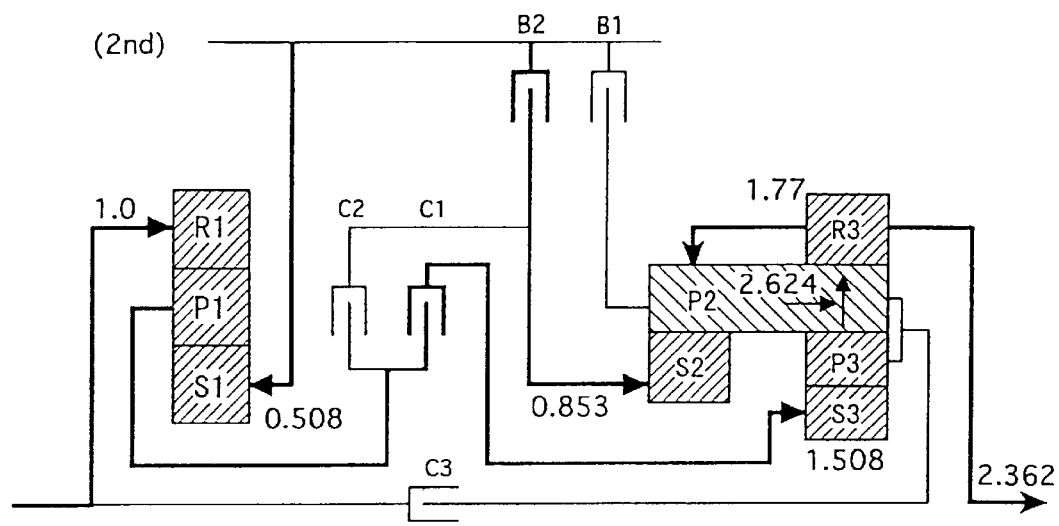
FIG. 7 is a torque circulation explaining diagram at the 2nd speed in a gear speed-changing apparatus for an automatic transmission using the Ravigneaux type composite planetary gear train.

(6) The torque, as raised by one set of single-pinion type planetary gearset as the speed-reducing device, is inputted from the sun gear of the Ravigneaux type composite planetary gear train, as shown in FIG. 7. For the aforementioned reason (2), therefore, the tangential force gets higher than the ring gear input so that disadvantages are involved in gear strength, gear lifetime, carrier rigidity and so on.

(7) In demand for securement of the strength (i.e., the gear strength or the gear lifetime) or improvement in the carrier rigidity of the Ravigneaux type composite planetary gear train at the 1st speed, it is necessary to enlarge the dimensions of the Ravigneaux type composite planetary gear train. This invites a large size of the automatic transmission.

(8) At the 2nd speed, as shown in FIG. 7, a torque circulation occurs in the Ravigneaux type composite planetary gear train so that the transmission efficiency drops to deteriorate the fuel economy at the 2nd speed where the torque circulation occurs. Here in the torque circulation, as shown in FIG. 7, there are branched from the third ring gear R3 an output torque (2.362) and a circulation torque (1.77), of which the circulation torque circulates inside of the third ring gear R3 and the second pinion 2nd speed range.

Features of Ishimaru Type Planetary Gear Train

Here will be described the features of the Ishimaru type planetary gear train which is adopted in the present invention in combination of the single-pinion type planetary gearset and the double sun gear type planetary gearset.

(a) For achieving the overdrive gear, there is needed the carrier input. With this carrier input being achieved, the Ishimaru type planetary gear train can position the input portion and the output portion on a common line as in the Ravigneaux type composite planetary gear train. As shown in FIG. 10(c), more specifically, the double sun gear type planetary gearset constructing the Ishimaru type planetary gear train increases the member number to five=(two members from the sun gear)+(one member from the ring gear)+(two members in axial and radial directions from the carrier). In particular, the input can be extracted radially from between the two sun gears by the center member thereby to achieve the carrier input in which higher speed ranges (e.g., 4th to 6th speeds in the first embodiment) including the overdrive hold.

(b) The Ishimaru type planetary gear train is advantageous in strength, because the maximum torque (at the 1st speed) of the gear train is borne by both the first planetary greatest G1 and the second planetary gearset of G2 the Ishimaru type planetary gear train, as shown in FIG. 5(a), so that the torque flow at the 1st speed can be shared among all members.

(c) The torque, as raised by one set of first planetary gearset G1 as the speed-reducing device, is inputted, as shown in FIG. 4(a) and FIG. 4(b), from the second ring gear R2 of the Ishimaru type planetary gear train at the 1st and 2nd speeds where the transmission torque is high. In comparison with the Ravigneaux type composite planetary gear train of the sun gear input, therefore, the tangential force is lowered to give an advantage (for the smaller size) in gear strength, gear lifetime, carrier rigidity and so on.

(d) As compared with the Ravigneaux type composite planetary gear train, the Ishimaru type planetary gear train is advantageous not only in strength but also in gear strength, gear lifetime, carrier rigidity and soon. Like the Ravigneaux type composite planetary gear train, moreover, the Ishimaru type planetary gear train can have the construction in which the input portion and the output portion are coaxially positioned Therefore, the gear speed-changing apparatus can be made compact to achieve the size reduction of the automatic transmission.

(e) At the 2nd speed of the Ishimaru type planetary gear train, as shown in FIG. 4(b), no torque circulation occurs to improve the transmission efficiency and the fuel economy better than those of the Ravigneaux type composite planetary gear train at the 2nd speed where the torque circulation occurs.

Specifically, FIG. 11 shows the contrasts between the Ravigneaux type composite planetary gear train and the Ishimaru type planetary gear train, in the case of considering a generally applicable gear ratio range ($\alpha$=0.35 to 0.65) of a gear ratio $\alpha$ (=sun gear tooth number/ring gear tooth number) and a preferable condition under which the step ratio is the smaller for the higher speed range. In view of the transmission efficiency at the 2nd speed, the Ravigneaux type composite planetary gear train takes a transmission efficiency of 0.950 or 0.952, and the Ishimaru type planetary gear train takes a transmission efficiency of 0.972, in case the first planetary gearset G1 is of the single-pinion type, and 0.968 in case the same is of the double-pinion type.

(f) The Ravigneaux type composite planetary gear train is regulated by a constant ring gear tooth number when the gear ratio $\alpha$ is to be set. Considering the condition of the generally applicable gear ratio range ($\alpha$=0.35 to 0.65) and the preferable condition of the smaller gear ratio for the higher speed range, therefore, the ratio coverage or the applicable gear ratio range (=1st speed gear ratio/6th speed gear ratio) is 4.81 at the minimum to 7.20 at the maximum, as shown in FIG. 11.

As compared with the Ravigneaux type composite planetary gear train, on the contrary, the Ishimaru type planetary gear train capable of setting gear ratios $\alpha 2$ and $\alpha 3$ of the two planetary gearsets G2 and G3 independently of each other, can have the applicable ratio coverage enlarged to enhance the degree of freedom for selecting the gear ratio as shown in FIG. 11, such as 4.81 at the minimum to 7.80 at the maximum of the case, in which the first planetary gearset G1 is of the single-pinion type, or 5.08 at the minimum to 9.02 at the maximum of the case, in which the same is of the double-pinion type, as indicated by the numerical values of FIG. 2 (wherein the numerical values 5.5 to 7.0 at the highest row indicate the ratio coverage).

The effects will be described in the following.

As has been described hereinbefore, the automatic transmission gear speed-changing apparatus of the first embodiment can achieve the effects based on the schematic diagram to be enumerated in the following.

(1) In a gear speed-changing apparatus for an automatic transmission comprising speed change control means including: an input shaft Input for inputting a rotation from a drive source; an output gear Output for outputting a speed-changed rotation; three sets of planetary gearsets G1, G2 and G3; a plurality of members M1 and M2 for connecting a plurality of rotary elements integrally; and three selectively connecting/disconnecting clutches C1, C2 and C3 and two selectively fixing brakes B1 and B2 positioned between the individual rotary elements of the input shaft Input, the output gear Output, the connection members M1 and M2 and the three planetary gearsets G1, G2 and G3, for achieving at least six forward speeds and one reverse speed by engaging/releasing said three clutches C1, C2 and C3 and two brakes B1 and B2 properly, one planetary gearset G1 of said three planetary gearsets G1, G2 and G3 is a speed-reducing device for reducing the speed of the input rotation always, and one planetary gearset G3 of the remaining two planetary gearsets G2 and G3 is a double sun gear type planetary gearset including: two sun gears S3 and S4; a pinion P3 meshing individually with said two sun gears S3 and S4; carrier having a center member CM positioned between said two sun gears S3 and S4 for inputting or outputting a rotation; and one ring gear R3 meshing with said pinion P3. Therefore, the automatic transmission gear speed-changing apparatus can enhance the degree of freedom for selecting the gear ratio, to a higher level than that of the case using the Ravigneaux type composite planetary gear train, while achieving altogether the strength advantages of the gear train constructed of the two planetary gearsets G2 and G3, the advantages such as the gear strength, gear lifetime or the like of the gear train constructed of the two planetary gearsets G2 and G3, an improvement in the fuel economy by eliminating the torque circulation, the coaxial positioning of the input shaft Input and the output gear Output, and the size reduction of the automatic transmission.

In addition, one planetary gearset G1 is made to act as the speed-reducing device for reducing the speed of the input rotation always, so that the size reduction of the speed-reducing device can be achieved to make the automatic transmission compact (corresponding to Claim 1).

(2) The first planetary gearset G1 acting as the speed-reducing device is a single-pinion type planetary gearset.

Therefore, the gear noise and the parts number can be reduced while improving the transmission efficiency and the fuel economy (corresponding to Claim 2).

(3) The automatic transmission gear speed-changing apparatus further comprises a hydraulic speed change control device, in which when the planetary gearset as the speed-reducing device is the first planetary gearset G1, when the double sun gear type planetary gearset is the third planetary gearset G3 and when the remaining planetary gearset is the second planetary gearset G2, said second planetary gearset G2 and said third planetary gearset G3 are the planetary gearsets which are constructed of five rotary members including the connection members M1 and M2 for connecting the rotary members of the second planetary gearset G2 and the rotary members of the third planetary gearset G3 integrally. The gear speed-changing apparatus comprises speed change control means including: a first rotary member connected to a second brake B2 capable of stopping (or fixing) one fourth sun gear S4 of the aforementioned third planetary gearset G3; a second rotary member connected to a second clutch C2 capable of connecting/disconnecting the other third sun gear S3 of the aforementioned third planetary gearset G3 and a first carrier PC1 of the aforementioned first planetary gearset G1 selectively; a third rotary member connected to the output gear Output through the second connection member M2; a third rotary member connected to the output gear Output through the second connection member M2; a fourth rotary member connected to a third clutch C3 capable of connecting/disconnecting the first ring gear R1 of the aforementioned first planetary gearset G1 selectively and a first brake B1 capable of stopping (or fixing) selectively; and a fifth rotary member connected to the first clutch C1 capable of connecting/disconnecting the first carrier PC1 of the aforementioned first planetary gearset G1 selectively, whereby there are established a 1st speed by the engagement of said first clutch C1 and the first brake B1, a 2nd speed by the engagement of the first clutch C1 and the second brake B2, a 3rd speed by the engagement of the first clutch C1 and the second clutch C2, a 4th speed by the engagement of the first clutch C1 and the third clutch C3, a 5th speed by the engagement of the second clutch C2 and the third clutch C3, a 6th speed by the engagement of the third clutch C3 and the second brake B2, and a reverse speed by the engagement of the second clutch C2 and the first brake B1, thereby to establish six forward speeds and one reverse speed. By enhancing the positioning layout of the clutches/the brakes/the individual members with the planetary gearset constructed of the five rotary members, i.e., the so-called "Ishimaru type planetary gear train", it is possible to provide the gear speed-changing apparatus of the six forward speeds and one reverse speed, which is enabled to improve the fuel economy to a high level by eliminating the torque circulation at the 2nd speed (corresponding to Claim 8).

(4) The automatic transmission gear speed-changing apparatus further comprises a hydraulic speed change control device including: the single-pinion type first planetary gearset G1 acting as the speed-reducing device having the first sun gear S1, the first ring gear R1, and the first carrier PC1 for supporting the first pinion P1 meshing with the two gears S1 and R1; the single-pinion type second planetary gearset G2 having the second sun gear S2, the second ring gear R2, and the second carrier PC2 for supporting the second pinion P2 meshing with the two gears S2 and R2; the double sun gear type third planetary gearset G3 having the two third sun gear S3 and fourth sun gear S4, the third carrier PC3 and the center member CM for supporting the third pinion P3 meshing individually with the two sun gears S3 and S4; one third ring gear R3 meshing with said third pinion P3; the input shaft Input connected to the first ring gear R1; the output gear Output connected to the second carrier PC2; the first connection member M1 for connecting the second sun gear S2 and the third sun gear S3 integrally; the second connection member M2 for connecting the second carrier PC2 and the third ring gear R3 integrally; the first clutch C1 for connecting/disconnecting the first carrier PC1 and the second ring gear R2 selectively; the second clutch C2 for connecting/disconnecting the first carrier PC1 and the second sun gear S2 selectively; the third clutch C3 for connecting/disconnecting the input shaft Input and the center member CM selectively; the first brake B1 for stopping the rotation of the third carrier PC3 selectively; and the second brake B2 for stopping the rotation of the fourth sun gear S4 selectively, for achieving the six forward speeds and one reverse speed. At the 1st speed and 2nd speed, therefore, the ring gear input can be achieved for the so-called "Ishimaru type planetary gear train", which is constructed of the second planetary gearset G2 and the third planetary gearset G3, and the automatic transmission can be made compact (corresponding to claim 9).

(5) The third planetary gearset G3 or the double sun gear type planetary gearset is the planetary gearset including the two sun gears S3 and S4 having the same tooth number, and the pinion P3 meshing individually with said two sun gears S3 and S4. Therefore, it is easy to machine the pinion P3 and to achieve an effect of easy manufacture. Moreover, a remarkable advantage is obtained for noise and vibration.

Detailed Description Based on the Layout of First Embodiment

Here will be described a construction on the basis of a concrete layout of an automatic transmission gear speed-changing apparatus of the present invention.

Figure 12:
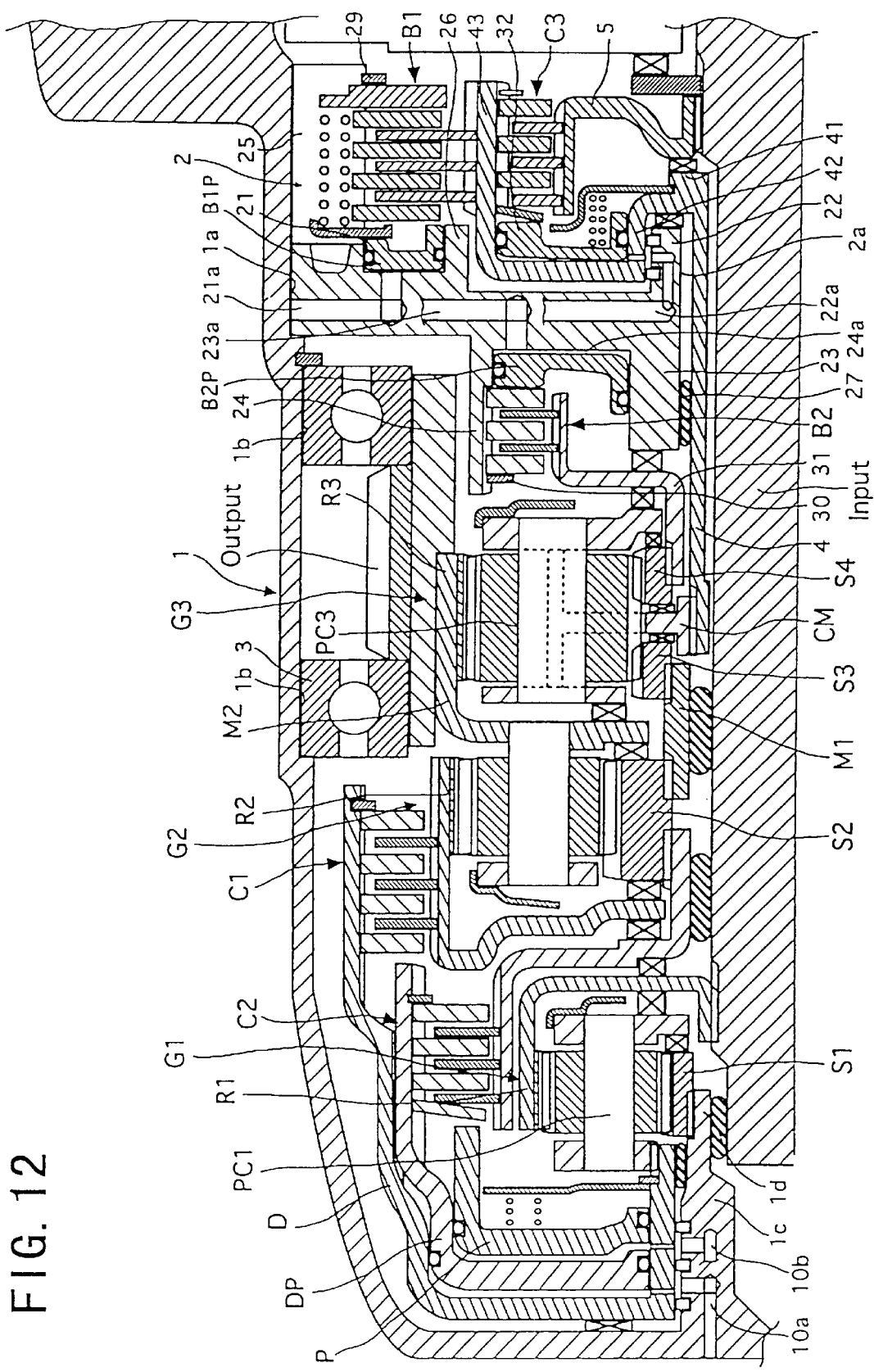
FIG. 12 is a section showing one example of the case in which the gear speed-changing apparatus of the first embodiment is concretely applied to an automatic transmission.

FIG. 12 is a section showing a specific construction of the gear speed-changing apparatus of the first embodiment. Numeral 1 designates a transmission case for housing the speed-changing apparatus, and numeral 2 designates an intermediate wall fixed and supported on the transmission case 1 for housing the third clutch C3, the first brake B1 and the second brake B2.

The speed-changing mechanism portion to be housed in the transmission case 1 is arranged from the side confronting the engine in the order of the first planetary gearset G1→the second planetary gearset G2→the third planetary gearset G3→the intermediate wall 2. Moreover, the second clutch C2 is arranged on the outer circumference side of the first planetary gearset G1, and the first clutch C1 is arranged on the outer circumference side of the second planetary gearset G2 adjacent to the second clutch C2.

Letter D designates the clutch drum of the first clutch C1; DP a drum piston acting as both the clutch drum of the second clutch C2 and the piston of the first clutch C1; and P the piston of the second clutch C2, and the clutch drum D and the drum piston DP of the first clutch C1 are splined to each other. Numeral 4 designates a member connected to the center member CM and acting as the hub portion of the first brake B1 and the drum of the third clutch C3.

The first and second clutches C1 and C2 are included in the aforementioned clutch drum D so that the control of the oil pressure is simplified by selecting the engaging force properly at the simultaneous engaging time of the first and second clutches C1 and C2 at the 3rd speed. In other words, the first clutch C1 and the second clutch C2 are simultaneously engaged at the 3rd speed. At this time, the ratio between the torque TC1 to be inputted to the first clutch C1 and the torque TC2 to be inputted to the second clutch C2 is expressed, if the gear ratio of the second planetary gearset G2 is designated by α2:

$$TC1:TC2=\{1/(1+\alpha 2)\}:\{\alpha 2/(1+\alpha 2)\}.$$

Therefore, a feature that the oil pressure control can be simplified without any need for feeding different oil pressures can be attained by setting the ratio in advance between the effective sectional area of the drum piston DP and the effective sectional area of the piston P, as follows:

Effective Sectional Area of DP: Effective Sectional Area of $P$ $$=\{1/(1+\alpha 2)\}:\{\alpha 2/(1+\alpha 2)\}.$$

Here, the effective sectional areas of the individual pistons have to be determined for the practical design, considering the number and the effective diameters of the individual clutches.

The transmission case 1 is provided with an intermediate wall fitting portion 1a or a portion having the largest external diameter of the engine side end portion for fixing and supporting the intermediate wall 2, and a portion having an intermediate external diameter of the generally central portion of the transmission case 1 or an output gear supporting portion 1b for fixing and supporting the output gear Output through a bearing 3. Further provided is a drum supporting portion 1c protruded to the engine side from the axially near portion of such an end portion of the transmission case 1 as confronts the engine for supporting the clutch drum D rotatably.

The drum supporting portion 1c supports the clutch drum D on the outer circumference side and the input shaft Input rotatably on the inner circumference side. Further provided is a sun gear supporting portion 1d located at the leading end of the drum supporting portion 1c on the engine side for fixing and supporting the sun gear S1 of the first planetary gearset G1.

In the drum supporting portion 1c, on the other hand, there are formed a first clutch oil passage 10a for feeding the oil pressure to the piston chamber of the first clutch C1 formed by the drum D and the drum piston DP, and a second clutch oil passage 10b for feeding the oil pressure to the piston chamber of the second clutch formed by the drum piston DP and the piston P.

In the intermediate wall 2, there is formed a through hole 2a, through which the input shaft Input extends. At the intermediate wall 2 on the side of the speed-changing mechanism, there are formed a first outer boss portion 24 and a first inner boss portion 23. Moreover, the inner circumference side of the first outer boss portion 24, the outer circumference side of the first inner boss portion 23 and the side face of the intermediate wall define a cylinder chamber 24a for housing the piston B2P of the second brake B2. In the spline groove on the leading end side of the first outer boss portion 24, moreover, there is so fitted the case side clutch plate of the second brake B2 as is regulated from an axial movement by a snap ring 30. On the other hand, the leading end side of the first outer boss portion 24 is so protruded on the inner circumference side of the output gear Output on the side of the speed-changing mechanism as to overlap the output gear Output axially, and is so arranged that a portion of the output gear Output and the clutch plate of the second brake B2 may overlap axially.

At the intermediate wall 2 on the engine side, there are formed a second outer boss portion 25, a third outer boss portion 26 and a second inner boss portion 22. The second outer boss portion 25 is formed to abut against the inner circumference of the transmission case 1 and to fit the case side clutch plate of the first brake B1 in the spline groove of its leading end side. Further fitted is a snap ring 29 for regulating the axial movement of the case side clutch plate. Moreover, the inner circumference side of the second outer boss portion 25, the outer circumference side of the third outer side boss portion 26 and the side face of the intermediate wall define a cylinder chamber 21 for housing the piston B1P of the first brake B1. On the other hand, the second inner boss portion 22 regulates the member 4 axially with its end portion side face of the engine side, and houses a part of the member 4 between its outer circumference side and the inner circumference side of the third outer boss portion 26.

In the intermediate wall 2, there are formed a first brake oil passage 21a for feeding the oil pressure to the piston chamber of the first brake B1, a second brake oil passage 23a for feeding the oil pressure to the piston chamber of the second brake B2, and a third clutch oil passage 22a for feeding the oil pressure to the piston chamber of the third clutch C3.

The member 4 is rotatably supported through a bushing 27 by the intermediate wall and is splined on the other side to the center member CM of the third planetary gearset G3. There is also provided a third clutch hub supporting portion 41 for supporting axially a third clutch hub 5 rotatably integrally with the input shaft Input. The supporting side back side confronting the supporting portion 41 substantially axially abuts the second inner boss portion 22 of the intermediate wall 2 through a thrust bearing 28. On the radially outer circumference side of the third clutch hub supporting portion 41, moreover, there is formed a piston cylinder chamber 42 which is raised on the axial side of the speed changing mechanism. This piston cylinder chamber 42 is housed between the outer circumference side of the second inner boss portion 22 and the inner circumference side of the third outer side boss portion 26. On the further radial side of the piston cylinder chamber 42, there is provided a drum hub portion 43, which is raised on the axial engine side. This drum hub portion 43 is splined on the outer circumference side to the drive plate of the first brake B1 and on the inner circumference side to the driven plate of the third clutch C3.

In the hub 31 of the second brake B2, the clutch plate is fitted in the spline groove on the engine side and is splined on the other side to the inner radial side of the fourth sun gear S4 of the third planetary gearset G3.

And, the automatic transmission gear speed-changing apparatus of the present invention is given a structure, which can be sub-assembled on such different lines that the bushing 27 is assembled in the through hole 2a of the intermediate wall 2, that the piston B2P of B2, the clutch plate and the hub 30 of the second brake B2 are assembled in the intermediate wall 2 on the speed-changing mechanism side, and that the piston B1P of the first brake B1, the clutch plate, the member 4, i.e., the hub of the second brake or the drum of the third clutch C3, the piston 32 of the third clutch C3, the clutch plate of the third clutch C3 and the clutch hub 5 are assembled on the engine side.

With the lefthand side of FIG. 12 being directed downward, therefore, the assembly can be made up to the bearing of the output gear and the third planetary gearset G3, and the intermediate wall and the input shaft, as sub-assembled on other lines, can be assembled in the recited order.

The effects will be described in the following.

As has been described hereinbefore, the automatic transmission gear speed-changing apparatus of the first embodiment can achieve the effects to be enumerated in the following.

(1) The intermediate wall 2 is provided with the cylinder chambers for the first brake B1 and the second brake B2 to support the third clutch C3 so that the clutches and the brakes can be efficiently positioned to make the entire length of the speed-changing apparatus compact. By positioning the clutches and the brakes concentrically near the intermediate wall, moreover, their oil passages can be easily positioned. Moreover, the first brake B1, the second brake B2 and the third clutch C3 can be sub-assembled in the intermediate wall 2 so that they can be easily manufactured (corresponding to Claim 1).

(2) By disposing the first brake B1 and the third clutch C3 for fixing the common rotary member in the common chamber, one member can achieve like the drum hub portion 43 the two functions of the drum function and the hub function thereby to reduce the number of parts and to make the simple construction (corresponding to Claim 2).

(3) The third clutch C3 has the same speed as that of the input shaft Input so that it has a relatively small torque capacity, and the first brake B1 engages (or is speed-reduced) at the 1st speed and at the reverse speed so that it has a large torque capacity. Here, the first brake B1 having the large torque capacity is disposed on the outer circumference side of the third clutch so that it can retain the area of the clutch plate. Therefore, the clutches and brakes are positioned efficiently for fixing the common rotary member so that the transmission can be made compact while retaining the necessary torque capacity. Moreover, the third clutch C3 is positioned on the side of the input shaft Input so that it can rotate integrally with the input shaft Input, and the member 5 for supporting the drive plate of the third clutch C3 can be shortened to make the transmission compact (corresponding to Claim 3).

(4) By positioning the third planetary gearset G3 for fixing the fourth sun gear S4 adjacent to the intermediate wall 2, the brake route of the fourth sun gear S4 can be made short and simple to make the transmission compact and to prevent the increase in the weight (corresponding to Claim 4).

(5) By positioning the first clutch C1 and the second clutch C2 or the clutches on the speed-reducing side close to each other, a double-piston structure can be made to make the transmission more compact. By arranging the first clutch C1 and the second clutch C2, i.e., the speed-reducing side clutches close to the second planetary gearset of the three planetary gearsets which are arranged in the order of the third, second and first planetary gearsets from the aforementioned intermediate wall side, moreover, the route of the speed-reducing side for transmitting the high torque can be shortened to reduce the size of the members requiring a high strength thereby to reduce the size and weight of the transmission (corresponding to Claim 5).

(6) The output gear Output is arranged to overlap the outer circumference side of the second brake B2 so that the axial size can be shortened (corresponding to Claim 6).

(7) By supporting the output gear Output by the bearing 3 supported directly on the inner wall of the transmission case 1, the supporting rigidity can be enhanced to prevent the gear noise from occurring (corresponding to Claim 7).

Although the automatic transmission gear speed-changing apparatus of the present invention has been described on the basis of the first embodiment, the concrete construction should not be limited to that embodiment but could be allowed to have modifications, additions or the like of the design so long as it does not deviate the gists of the present invention, as described in the individual Claims.

Industrial Applicability

As has been described hereinbefore, the automatic transmission gear speed-changing apparatus according to the present invention is useful as a vehicular speed-changing apparatus required to have multiple gear stages and is suitably used in the gear speed-changing apparatus of an automatic transmission, which is connected to the drive source output shaft of an automobile having an engine or motor mounted thereon as the drive source.

What is claimed is:

1. A gear speed-changing apparatus for an automatic transmission comprising:

a transmission case;

an input portion that inputs a rotation from a drive source;

an output portion that outputs a speed-changed rotation;

three sets of planetary gearsets disposed in the case;

a plurality of members disposed in the case to connect a plurality of rotary elements integrally;

three selectively connecting/disconnecting clutches and two selectively fixing brakes provided in the case and located between the individual rotary elements of the input portion, the output portion, the members and the three planetary gearsets, to achieve at least six forward speeds and one reverse speed by engaging/releasing the three clutches and two brakes properly;

one planetary gearset of the three planetary gearsets comprising a speed-reducing device that reduces input speed always;

one planetary gearset of the remaining two planetary gearsets comprising a double sun gear type planetary gearset including: two sun gears; a pinion in meshed-engagement with each of the two sun gears; a center member located between the two sun gears to input or output a rotation; a carrier having a side member that supports at least one side of the pinion; and one ring gear in meshed-engagement with the pinion;

the remaining planetary gearset comprising a single-pinion type planetary gearset including: one sun gear; a pinion in meshed-engagement with the sun gear; a carrier that supports the pinion; and one ring gear in meshed-engagement with the pinion; and an intermediate wall disposed in the case and defining the case inside into one side and the other side to form two brake cylinder chambers for the two brakes, and having a portion for supporting a clutch drum of one of the three clutches.

2. A gear speed-changing apparatus for an automatic transmission as set forth in claim 1, wherein:

one planetary gearset of the three planetary gearsets is a first planetary gearset acting as a speed-reducing device for reducing the input speed always, and including: a first sun gear; a first ring gear; and a first carrier for supporting-a pinion in meshed-engagement with both the first sun gear and the first ring gear;

one planetary gearset of the three planetary gearsets is a double sun gear type third planetary gearset including: third and fourth sun gears; a pinion in meshed-engagement with both the third and fourth sun gears; a third carrier located between the two sun gears and having a center member that inputs or outputs a rotation; and a third ring gear in meshed-engagement with the pinion;

one planetary gearset of the three planetary gearsets comprises a second single-pinion type planetary gearset including a second sun gear; a second ring gear; and a second carrier supporting a pinion in meshed-engagement with both the second sun gear and the second ring gear;

which further comprises:
an input portion connected to the first ring gear;
an output portion connected to the second carrier;
a first connection member for connecting the second sun gear and the third sun gear integrally;
a second connection member for connecting the second carrier and the third ring gear integrally;
a first clutch for connecting/disconnecting the first carrier and the second ring gear selectively;
a second clutch for connecting/disconnecting the first carrier and the first connection member selectively;
a third clutch for connecting/disconnecting the third carrier and the input portion selectively;
a first brake for stopping the rotation of the third carrier selectively; and
a second brake for stopping the rotation of the fourth sun gear selectively; and
wherein the second brake is located on the one side of the intermediate wall whereas the first brake and the third clutch are located on the other side.

3. A gear speed-changing apparatus for an automatic transmission as set forth in claim 2, wherein:
the first brake is arranged on an outer circumference of the third clutch.

4. A gear speed-changing apparatus for an automatic transmission as set forth in claim 2, wherein:
the double sun gear type planetary gearset, the single-pinion type planetary gearset, and the planetary gearset acting as the speed-reducing device are arranged in the one side chamber in that order from the intermediate wall side.

5. A gear speed-changing apparatus for an automatic transmission as set forth in claim 2, wherein:
the first clutch and the second clutch are arranged close to the single-pinion type planetary gearset.

6. A gear speed-changing apparatus for an automatic transmission as set forth claim 1, wherein:
the output portion is arranged to overlap the outer circumference side of an inside one of the two brakes axially.

7. A gear speed-changing apparatus for an automatic transmission as set forth in claim 1, wherein:
the output portion is supported by a bearing supported on an inner wall of the case.

8. A gear speed-changing apparatus for an automatic transmission as set in claim 1, wherein:
the planetary gearset acting as the speed-reducing device comprises a first planetary gearset acting as the speed-reducing device including: a first sun gear; a first ring gear; and a first carrier for supporting a first pinion in meshed-engagement with both the first sun gear and the first ring gear;

the double sun gear type planetary gearset comprises a double sun gear type third planetary gearset including: third and fourth sun gears; a third carrier and a center member for supporting a third pinion in meshed-engagement with both the third and fourth sun gears; and a third ring gear in meshed-engagement with the third pinion;

the single-pinion type planetary gearset comprises a second planetary gearset including: a second sun gear; a second ring gear; and a second carrier supporting a second pinion in meshed-engagement with both the second sun gear and the second ring gear;

which further comprises:
an input portion connected to the first ring gear;
an output portion connected to the second carrier;
a first connection member for connecting the second sun gear and the third sun gear integrally;
a second connection member for connecting the second carrier and the third ring gear integrally;
a first clutch for connecting/disconnecting the first carrier and the second ring gear selectively;
a second clutch for connecting/disconnecting the first carrier and the second sun gear selectively;
a third clutch for connecting/disconnecting the input portion and the center member selectively;
a first brake for stopping the rotation of the third carrier or the center member selectively; and
a second brake for stopping the rotation of the fourth sun gear selectively,
whereby there are established a 1st speed by engagement of the first clutch and the first brake, a 2nd speed by engagement of the first clutch and the second brake, a 3rd speed by engagement of the first clutch and the second clutch, a 4th speed by engagement of the first clutch and the third clutch, a 5th speed by engagement of the second clutch and the third clutch, a 6th speed by engagement of the third clutch and the second brake, and a reverse speed by engagement of the second clutch and the first brake, thereby to establish six forward speeds and one reverse speed.

9. A gear speed-changing apparatus for an automatic transmission as set forth in claim 1, wherein:
one planetary gearset acting as the speed-reducing device comprises a single pinion type planetary gearset.

* * * * *